United States Patent
Augustine

(10) Patent No.: US 10,982,747 B2
(45) Date of Patent: Apr. 20, 2021

(54) STEERING SYSTEM HAVING AN ADJUSTMENT ASSEMBLY

(71) Applicant: STEERING SOLUTIONS IP HOLDING CORPORATION, Saginaw, MI (US)

(72) Inventor: Michael J. Augustine, Mayville, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 53 days.

(21) Appl. No.: 16/206,309

(22) Filed: Nov. 30, 2018

(65) Prior Publication Data
US 2019/0185051 A1  Jun. 20, 2019

Related U.S. Application Data

(60) Provisional application No. 62/599,052, filed on Dec. 15, 2017.

(51) Int. Cl.
| | |
|---|---|
| *F16H 55/28* | (2006.01) |
| *F16H 25/22* | (2006.01) |
| *B62D 3/12* | (2006.01) |
| *B62D 5/04* | (2006.01) |

(52) U.S. Cl.
CPC .......... *F16H 55/288* (2013.01); *B62D 3/123* (2013.01); *F16H 25/2209* (2013.01); *F16H 55/283* (2013.01); *B62D 5/0448* (2013.01); *F16C 2326/24* (2013.01)

(58) Field of Classification Search
CPC ..... F16H 55/283; F16H 55/288; B62D 3/123; B62D 3/126; Y10T 74/177; Y10T 74/18096
See application file for complete search history.

(56) References Cited

U.S. PATENT DOCUMENTS

| | | | | |
|---|---|---|---|---|
| 5,117,705 A | * | 6/1992 | Guasch | B62D 3/123 74/422 |
| 6,543,569 B1 | * | 4/2003 | Shimizu | B21K 1/767 180/444 |
| 6,921,096 B2 | * | 7/2005 | Yang | B62D 3/123 280/93.514 |

(Continued)

FOREIGN PATENT DOCUMENTS

| | | | | |
|---|---|---|---|---|
| DE | 10344726 A1 | * | 5/2005 | ............ B62D 3/123 |
| FR | 1477739 A | | 4/1967 | |

(Continued)

OTHER PUBLICATIONS

First Office Action and Search Report from the China National Intellectual Property Administration for related Chinese Patent Application No. 2018115322398 dated Jan. 4, 2021.

*Primary Examiner* — Bobby Rushing, Jr.
(74) *Attorney, Agent, or Firm* — Dickinson Wright PLLC

(57) ABSTRACT

A steering assembly includes a rack and an adjustment assembly. The rack has a first side surface, a second side surface disposed opposite the first side surface, a first surface extending between the first side surface and the second side surface, and a second surface disposed opposite the first surface. The adjustment assembly is arranged to apply orthogonal biasing forces to a pair of orthogonal surfaces of the non-cylindrical steering rack.

19 Claims, 2 Drawing Sheets

(56) References Cited

U.S. PATENT DOCUMENTS

| | | | | |
|---|---|---|---|---|
| 7,309,073 B2* | 12/2007 | Nishiko | ................... | B62D 3/12 |
| | | | | 280/93.514 |
| 9,316,294 B2* | 4/2016 | Nomura | ................... | F16H 19/04 |
| 9,376,138 B2* | 6/2016 | Imamura | ............... | F16H 55/283 |
| 9,469,333 B2* | 10/2016 | Takei | ..................... | B62D 3/126 |
| 9,475,518 B2* | 10/2016 | Tomizawa | ............. | F16H 55/28 |
| 2005/0061575 A1* | 3/2005 | Abe | ...................... | B62D 3/123 |
| | | | | 180/444 |
| 2005/0126328 A1* | 6/2005 | Piotrowski | ............ | B62D 3/123 |
| | | | | 74/492 |
| 2006/0185460 A1* | 8/2006 | Shiino | ................... | B62D 3/123 |
| | | | | 74/422 |
| 2014/0020492 A1* | 1/2014 | Fujita | .................... | B62D 3/123 |
| | | | | 74/422 |
| 2016/0167697 A1* | 6/2016 | Minami | .................. | B62D 3/12 |
| | | | | 74/89.23 |
| 2017/0158221 A1* | 6/2017 | Yamamoto | ............ | F16H 25/20 |
| 2017/0320514 A1* | 11/2017 | Sakamoto | ............ | F16C 29/064 |

FOREIGN PATENT DOCUMENTS

| | | | | |
|---|---|---|---|---|
| GB | 176052 | | 12/1951 | |
| GB | 2411874 A | | 9/2014 | |
| JP | 11222142 A | | 8/1999 | |
| JP | 2002234448 A | * | 8/2002 | ........... F16H 55/283 |
| KR | 20130065151 A | | 6/2013 | |
| KR | 20140136082 A | | 11/2014 | |
| WO | WO-8304079 A1 | * | 11/1983 | ............. F16C 29/02 |
| WO | WO-0249904 A1 | * | 6/2002 | ............. B62D 3/123 |

\* cited by examiner

STEERING SYSTEM HAVING AN ADJUSTMENT ASSEMBLY

CROSS-REFERENCES TO RELATED APPLICATIONS

This patent application claims priority to U.S. Provisional Patent Application Ser. No. 62/599,052, filed Dec. 15, 2017, which is incorporated herein by reference in its entirety.

STATEMENT REGARDING FEDERALLY SPONSORED RESEARCH OR DEVELOPMENT

None.

BACKGROUND

Steering systems may employ a ball screw that converts a rotational input into a linear steering output to pivot at least one vehicle road wheel. A rack assist electric power steering system may include a ball screw. In such a system, a steering gear is engaged with the rack and may provide ball screw torque reaction. The ball screw torque may cause rotation of the rack that may result in an error in steering gear and rack mesh alignment.

SUMMARY

Disclosed is a steering assembly that includes a non-cylindrical steering rack, a steering gear, and an adjustment assembly. The non-cylindrical steering rack extends along a central axis between a first end and a second end. The non-cylindrical steering rack having a first side surface, a second side surface disposed opposite the first side surface, a first surface extending between the first side surface and the second side surface, and a second surface disposed opposite the first surface. The first surface defines a plurality of rack teeth. The steering gear is in meshed engagement with the plurality of rack teeth. The adjustment assembly includes a first adjustment member arranged to apply a first biasing force to the first side surface, and a second adjustment member arranged to apply a second biasing force to the second surface.

Also disclosed is a steering assembly that includes a rack and an adjustment assembly. The rack has a first side surface, a second side surface disposed opposite the first side surface, a first surface extending between the first side surface and the second side surface, and a second surface disposed opposite the first surface. The adjustment assembly is arranged to apply orthogonal biasing forces to a pair of orthogonal surfaces of the non-cylindrical steering rack.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
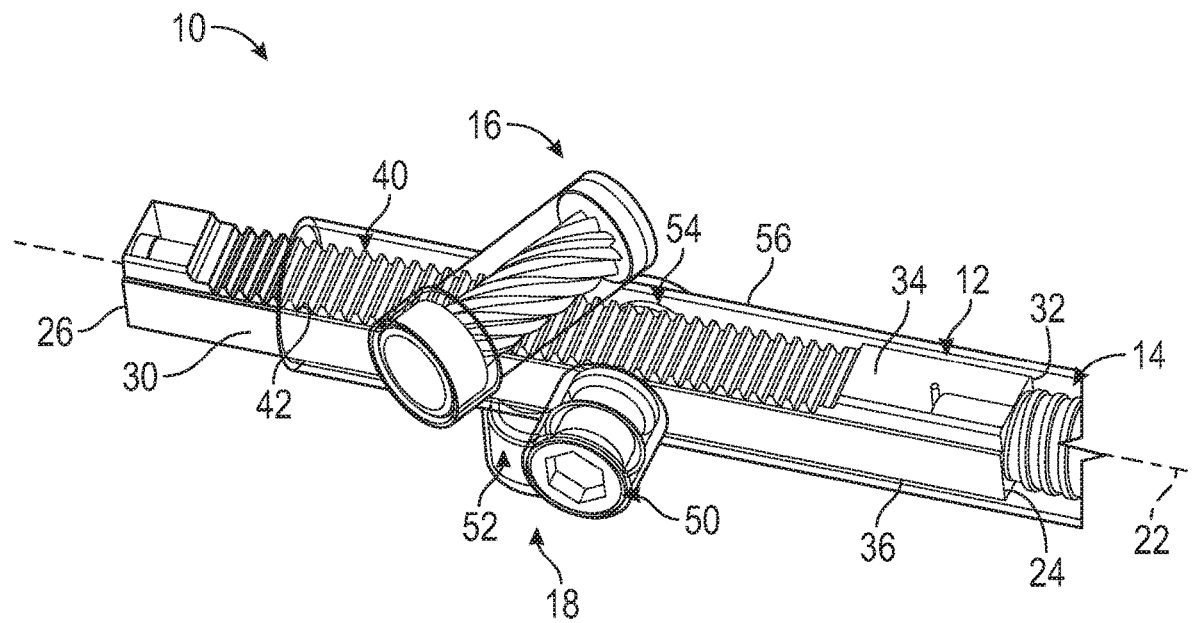
FIG. 1 is a first perspective view of a steering system.
Figure 2:
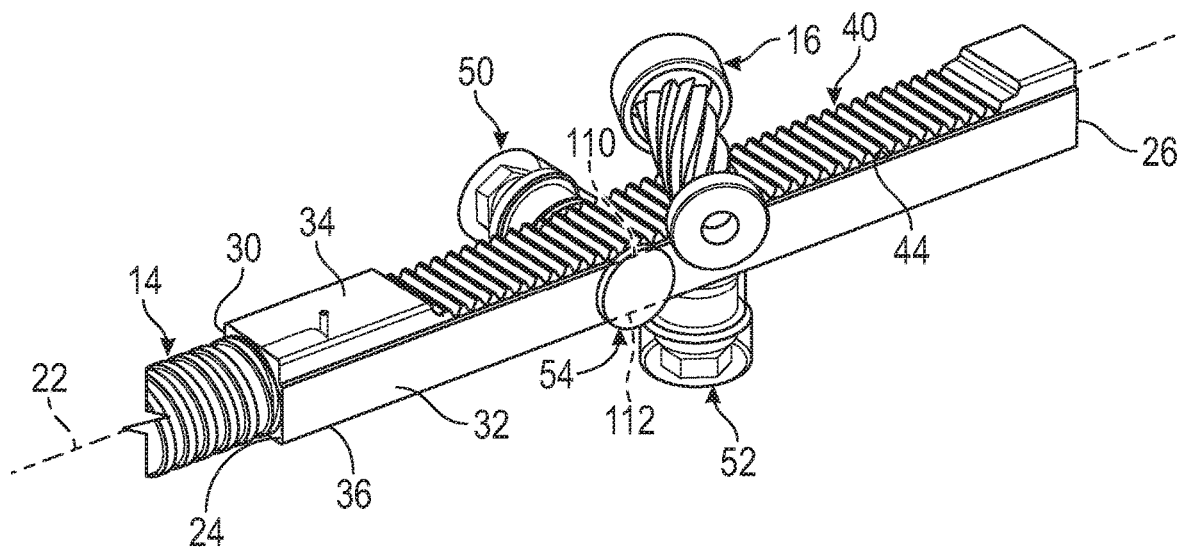
FIG. 2 is a second perspective view of the steering system.
Figure 3:
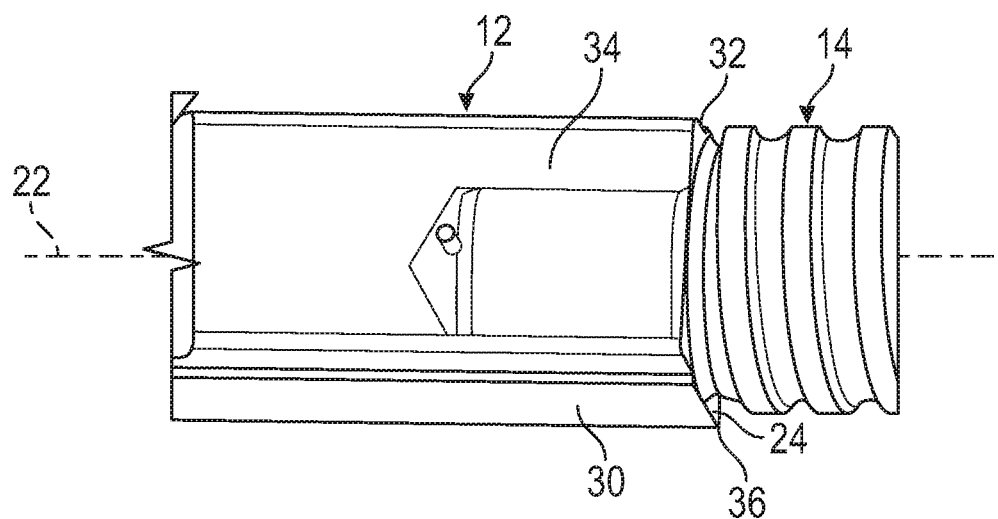
FIG. 3 is a view of a portion of a steering rack and ball screw of the steering system.

Referring to FIGS. 1-3, a steering assembly 10 is shown. The steering assembly 10 may be a ball screw assisted steering system having a steering rack 12, a ball screw 14, a steering gear 16, and an adjustment assembly 18.

The steering rack 12 may be a non-cylindrical steering rack provided with a substantially rectangular prismatic shape having sides that are disposed orthogonal to each other. The non-cylindrical steering rack 12 extends along a central axis 22 between a first end 24 and a second end 26 at least partially through a rack housing. The non-cylindrical steering rack 12 may present greater section properties as compared to traditional round steering racks.

The ball screw 14 may extend into the first end 24 of the non-cylindrical steering rack 12. The ball screw 14 and the non-cylindrical steering rack 12 may be formed as separate components that are later joined together at a joint such as a vented light press male-female joint with an interfacial weld where position and orientation of the ball screw 14 and the non-cylindrical steering rack 12 are controlled by the cylindrical interface. The ball screw 14 and the non-cylindrical steering rack 12 may be joined with friction weld, laser weld, or other similar joint. The ball screw 14 and the non-cylindrical steering rack 12 may be integrally formed together. At least one tie rod or other connection member extends from the second end 26 of the non-cylindrical steering rack 12 and/or the outboard end of ball screw 14. The ball screw 14 engages a ball nut, a series of ball members, and a powered transmission to convert rotary motion into linear motion that translates the non-cylindrical steering rack 12 along the central axis 22 to cause the tie rod or connection member to pivot and/or steer at least one vehicle wheel.

The non-cylindrical steering rack 12 includes a first side surface 30, a second side surface 32 that is disposed opposite the first side surface 30, a first surface 34 extending between the first side surface 30 and the second side surface 32, and a second surface 36 disposed opposite the first surface 34 and extending between the first side surface 30 and the second side surface 32.

The first surface 34 may be a top surface of the steering rack 12 that is disposed orthogonal to the first side surface 30 and the second side surface 32. In other words, the first side surface 30 is disposed orthogonal to the first surface 34 and the second side surface 32 is disposed orthogonal to the first surface 34. The first surface 34 defines a plurality of rack teeth 40 that extends between but are spaced apart from the first end 24 and the second end 26 of the non-cylindrical steering rack 12 along the central axis 22. The helices of the plurality of rack teeth 40 are disposed parallel to and opposite at least one of the first side surface 30, the second side surface 32, and the second surface 36.

A first relief 42 extends between the first surface 34 and the first side surface 30 and spaces the rack teeth 40 apart from the first side surface 30. A second relief 44 extends between the first surface 34 and the second side surface 32 and spaces the rack teeth 40 apart from the second side surface 32. The first relief 42 and the second relief 44 prevent interaction between the plurality of rack teeth 40 and the adjustment assembly 18.

The steering gear 16 is in meshed engagement with the plurality of rack teeth 40. The steering gear 16 may be arranged as at least one pinion gear. The steering gear 16 may be arranged as a mating pinion that may be produced with or without an axial crown. The steering gear 16 may react a share of the ball screw torque load when not crowned. However, the reaction force and wear potential of the steering gear 16 while crowned may be reduced.

The adjustment assembly 18 is arranged to apply orthogonal biasing forces to a pair of orthogonal surfaces of the non-cylindrical steering rack 12. The adjustment assembly 18 enables the axiomatic clearance adjustment in each of the orthogonal directions to permit independent control of mesh friction and ball screw torque reaction or bar rotation. The splitting of reaction loads applied by the ball nut to the adjustment assembly 18 between orthogonal and opposed surfaces greatly reduces the side-loading on the adjustment assembly 18 as well as reduces the potential for noise generation.

The adjustment assembly 18 includes a first adjustment member 50, a second adjustment member 52, and a reaction pad 54. The reaction pad 54 may be configured as an additional or third adjustment member with a similar construction as the first adjustment member 50 to provide further control of mesh friction, ball screw torque reaction, or steering rack rotation constraint.

The first adjustment member 50 and the second adjustment member 52 may extend through or be supported by the housing 56 through which the non-cylindrical steering rack 12 extends. The first adjustment member 50 is arranged to apply a first biasing force to the first side surface 30 of the non-cylindrical steering rack 12. The reaction pad 54 is disposed on or is arranged to engage the second side surface 32 of the non-cylindrical steering rack 12 and is disposed substantially opposite the first adjustment member 50. The reaction pad 54 is supported by an interior surface of the rack housing 56 and is disposed opposite the first adjustment member 50. The combination of the first adjustment member 50 and the reaction pad 54 provide an anti-rotate feature that is arranged to minimize or inhibit ball screw torque reaction or steering rack 12 rotation about the central axis 22. The anti-rotate feature or function of the first adjustment member 50 and the reaction pad 54 may be offset inboard or outboard relative to the steering gear 16 and the second adjustment member 52.

The second adjustment member 52 is spaced apart from or offset from the first adjustment 50 along the central axis 22. The second adjustment member 52 is disposed substantially opposite the steering gear 16. The second adjustment member 52 is arranged to apply a second biasing force to the second surface 36 of the non-cylindrical steering rack 12 to control or vary the mesh between the plurality of rack teeth 40 and the steering gear 16.

Figure 4:
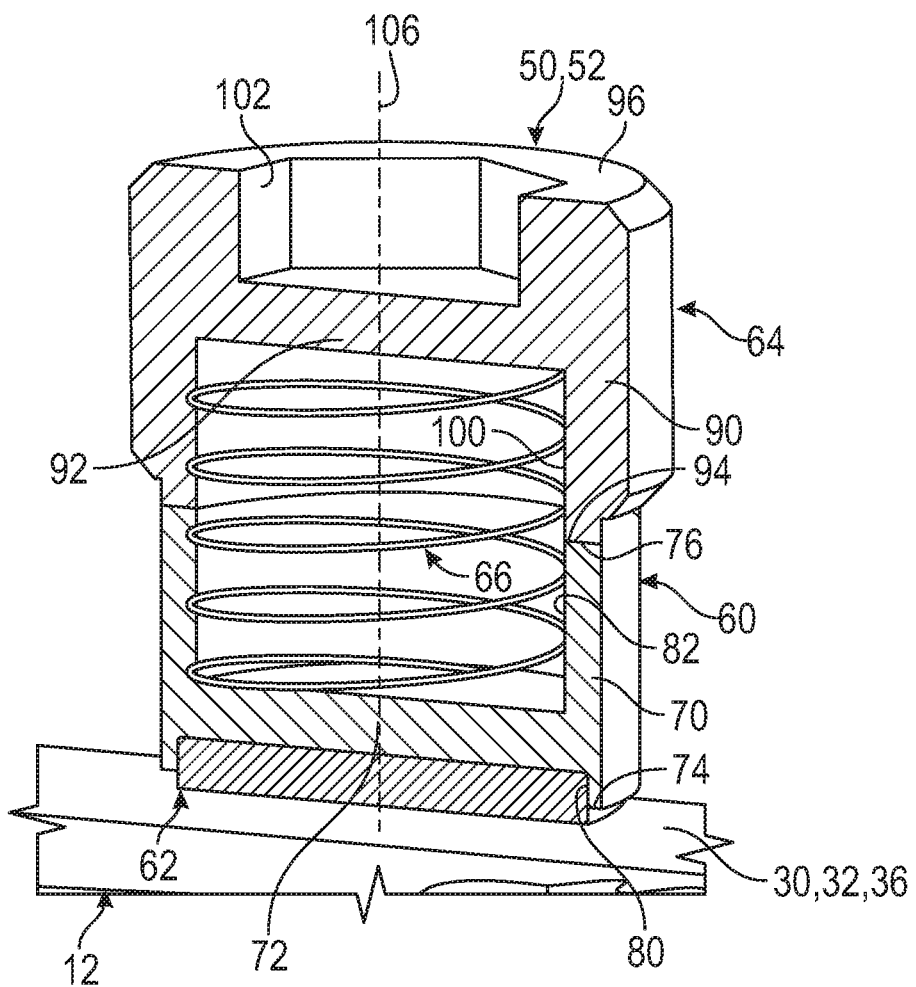
FIG. 4 is a cross-sectional view of an adjustment member of the steering system.

Referring to FIG. 4, the first adjustment member 50 and the second adjustment member 52 may have a substantially similar configurations. The first adjustment member 50 and the second adjustment member 52 are physically independent of each other and independently apply biasing forces that are substantially normal to orthogonal surfaces of the non-cylindrical steering rack 12 to at least reduce ball-nut torque reaction forces applied to the steering gear 16. The first adjustment member 50 extends through a first bore of the housing 56 and the second adjustment member 52 extends through a second bore of the housing 56 that is spaced apart from the first bore. The first adjustment member 50 and the second adjustment member 52 each include a rack bearing 60, a rack bearing liner 62, an adjuster plug 64, and a biasing member 66.

The rack bearing 60 fits into a bore of the housing 56, as shown in FIG. 1, and is arranged to move within the bore of the housing 56. The rack bearing 60 includes a rack bearing wall 70 that is disposed about a rack bearing floor 72. The rack bearing wall 70 extends between a first rack bearing end 74 and a second rack bearing end 76. The first rack bearing end 74 extends beyond the rack bearing floor 72 in a first direction and the second rack bearing end 76 extends beyond the rack bearing floor 72 in a second direction that is disposed opposite the first direction.

The rack bearing 60 defines a first rack bearing cavity 80 and the second rack bearing cavity 82. The first rack bearing cavity 80 extends from the first rack bearing end 74 to a first side of the rack bearing floor 72. The second rack bearing cavity 82 extends from the second rack bearing end 76 to a second side of the rack bearing floor 72.

The rack bearing liner 62 is at least partially disposed within the first rack bearing cavity 80 of the rack bearing 60, such that the rack bearing liner 62 extends beyond the first rack bearing end 74 in the first direction. The rack bearing liner 62 is arranged as a planar member that engages at least one of the planar contact surfaces of the non-cylindrical steering rack 12 (e.g. the first side surface 30, the second side surface 32 and the second surface 36), based on the arrangement of the adjustment assembly 18. Alternatively, the rack bearing 60 and the rack bearing liner 62 may be integrated into a single contiguous form.

The adjuster plug 64 extends at least partially through the bore of the housing 56 through which the non-cylindrical steering rack 12 extends. The adjuster plug 64 is provided with external threads that engage with the housing 56 to position the adjuster plug 64. The adjuster plug 64 is movably or adjustably connected to the housing 56 and/or the rack bearing 60 to compress or otherwise enable a biasing member to vary the first biasing force applied by the first adjustment member 50 applied to a surface of the non-cylindrical steering rack 12 or to vary the second biasing force applied by the second adjustment member 52 applied to a surface of the non-cylindrical steering rack 12.

The adjuster plug 64 includes an adjuster plug wall 90 that is disposed about an end wall 92. The adjuster plug wall 90 extends between a first adjuster plug end 94 and a second adjuster plug end 96. The first adjuster plug end 94 may be disposed proximate the second rack bearing end 76 and a position of the first adjuster plug end 94 may be varied relative to the second rack bearing end 76. The first adjuster plug end 94 extends beyond the end wall 92 in the first direction and the second adjuster plug end 96 extends beyond the end wall 92 in the second direction.

The adjuster plug 64 defines an adjuster plug cavity 100 and an adjustment cavity 102. The adjuster plug cavity 100 extends from the first adjuster plug end 94 to a first side of the end wall 92. The adjustment cavity 102 extends from the second adjuster plug end 96 to a second side of the end wall 92. The adjustment cavity 102 is sized to receive a tool to enable the adjuster plug 64 to be moved relative to the rack bearing 60. Alternatively, the adjustment cavity 102 may be configured as an external feature above the adjuster plug end 96.

The biasing member 66 may be a spring element that extends between and engages the end wall 92 of the adjuster plug 64 and the rack bearing floor 72 of the rack bearing 60. The biasing member 66 is disposed within and extends between the adjuster plug cavity 100 and the second rack bearing cavity 82. The biasing member 66 is arranged to apply a biasing force to the rack bearing liner 62 through the rack bearing floor 72. The biasing force may be varied based on a position of the adjuster plug 64 relative to the rack bearing 60. During operation the position of adjuster plug 64 is established with respect to the rack housing 56, for example by a threaded connection, such that a small initial gap exist between a surface of the second rack bearing end 76 and the adjuster plug surface 94. The biasing member 66 pushes or urges the rack bearing 60 into contact with non-cylindrical steering rack 12. Steering assist and tie rod loads may cause displacement of the rack bearing 60 along a centerline axis 106 of the adjustment member 50, 52 within a bore of the housing 56, the centerline axis 106 being disposed transverse to the central axis 22, against the restoring force of the biasing member 66. This displacement is limited by the initial gap between a surface of the second rack bearing end 76 and the adjuster plug surface 94. The gap may be closed or become zero if the operational reaction load acting along the axis 106 is greater than the spring resistance force of the biasing member 66 at which point the adjuster plug 64 acts as a motion limit for the rack bearing 60.

The movement of the end wall 92 of the adjuster plug 64 relative to the rack bearing floor 72 of the rack bearing 60 varies the biasing force of the biasing member 66 such that the biasing force applied to the non-cylindrical steering rack 12 by at least one of the first adjustment member 50 and the second adjustment member 52 is varied.

Referring to FIGS. 1 and 2, the reaction pad 54 is arranged to engage the second side surface 32 and is disposed substantially opposite the first adjustment member 50. The reaction pad 54 may be directly grounded to the housing 56 through which the non-cylindrical steering rack 12 at least partially extends through. The reaction pad 54 is offset from the second adjustment member 52 along the central axis 22. The reaction pad 54 has a cross-sectional form that is greater than a height of the non-cylindrical steering rack 12 that extends between the first surface 34 and the second surface 36. The greater cross-sectional form of the reaction pad 54 compared to the height of the non-cylindrical steering rack 12 increases the length of contact where contact forces are maximum, proximate a first reaction line 110 and a second reaction line 112, as shown in FIG. 2. The first reaction line 110 may be disposed proximate the second relief 44 and the second reaction line 112 may be disposed proximate a junction between the second side surface 32 and the second surface 36.

In other arrangements, the reaction pad 54 may be replaced with another adjustment member that is disposed substantially opposite the first adjustment member 50.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering assembly, comprising:
   a non-cylindrical steering rack, extending along a central axis between a first end and a second end through a housing, the non-cylindrical steering rack having a first side surface, a second side surface disposed opposite the first side surface, a first surface extending between the first side surface and the second side surface, and a second surface disposed opposite the first surface, the first surface defining a plurality of rack teeth;
   a steering gear in meshed engagement with the plurality of rack teeth; and
   an adjustment assembly, comprising:
      a first adjustment member arranged to apply a first biasing force to the first side surface, and
      a second adjustment member arranged to apply a second biasing force to the second surface.

2. The steering assembly of claim 1, wherein the first biasing force is arranged to be varied independently of the second biasing force.

3. The steering assembly of claim 1, the first biasing force is applied normal to the first side surface and the second biasing force is applied normal to the second surface.

4. The steering assembly of claim 3, the non-cylindrical steering rack has a rectangular prismatic shape such that helices of the rack teeth are parallel to and opposite to the second surface.

5. The steering assembly of claim 1, at least one of the first adjustment member and the second adjustment member, comprising:
   a rack bearing that fits into a bore of the housing, the rack bearing having a rack bearing wall disposed about a rack bearing floor, the rack bearing wall extending between a first rack bearing end and a second rack bearing end, the rack bearing defining a first rack bearing cavity that extends from the first rack bearing end to the rack bearing floor and defining a second rack bearing cavity; and
   a rack bearing liner at least partially disposed within the first rack bearing cavity.

6. The steering assembly of claim 5, the rack bearing liner is arranged to engage a surface of the non-cylindrical steering rack.

7. The steering assembly of claim 5, the rack bearing liner is a planar member.

8. The steering assembly of claim 5, at least one of the first adjustment member and the second adjustment member, further comprising:
   an adjuster plug that is adjustably connected to the housing, the adjuster plug having an adjuster plug wall disposed about an end wall, the adjuster plug wall extending between a first adjuster plug end and a second adjuster plug end, the adjuster plug defining an adjuster plug cavity that extends from the first adjuster plug end to the end wall.

9. The steering assembly of claim 8, at least one of the first adjustment member and the second adjustment member, further comprising:
   a biasing member extending between the adjuster plug cavity and the second rack bearing cavity and engaging the end wall and the rack bearing floor.

10. The steering assembly of claim 9, movement of the end wall of the adjuster plug relative to the rack bearing floor of the rack bearing varies a biasing force of the biasing member such that the first biasing force applied to the first side surface is varied.

11. The steering assembly of claim 9, movement of the end wall of the adjuster plug relative to the rack bearing floor of the rack bearing varies a biasing force of the biasing member such that the second biasing force applied to the second surface is varied.

12. The steering assembly of claim 1, the first adjustment member is offset from the second adjustment member along the central axis.

13. The steering assembly of claim 1, further comprising:
a ball screw extending into the first end of the non-cylindrical steering rack.

14. The steering assembly of claim 13, the first adjustment member and the second adjustment member are arranged to vary a mesh between the steering gear and the plurality of rack teeth of the non-cylindrical steering rack and inhibit rotation of the non-cylindrical steering rack about the central axis.

15. A steering assembly, comprising:
a rack having a first side surface, a second side surface disposed opposite the first side surface, a first surface extending between the first side surface and the second side surface, and a second surface disposed opposite the first surface; and
an adjustment assembly arranged to apply orthogonal biasing forces to a pair of orthogonal surfaces of the rack, the adjustment assembly comprising:
a first adjustment member supported by a housing through which the rack extends, the first adjustment member arranged to apply a first biasing force normal to the first side surface; and
a second adjustment member supported by the housing, the second adjustment member arranged to apply a second biasing force normal to the second surface that is disposed orthogonal to the first side surface.

16. The steering assembly of claim 15, the adjustment assembly, further comprising:
a reaction pad arranged to engage the second side surface.

17. The steering assembly of claim 16, the reaction pad having a cross-sectional form that is greater than a height of the rack that extends between the first surface and the second surface.

18. The steering assembly of claim 15, at least one of the first adjustment member and the second adjustment member, comprising:
a rack bearing liner at least partially disposed within a rack bearing that is received within a bore of the housing;
an adjuster plug movably connected to the rack bearing; and
a biasing member disposed within and extending between the adjuster plug and the rack bearing, the biasing member arranged to vary at least one of the first biasing force and the second biasing force based on a position of the adjuster plug relative to the rack bearing.

19. The steering assembly of claim 15, wherein the steering rack is a non-cylindrical steering rack.

* * * * *